UNITED STATES PATENT OFFICE.

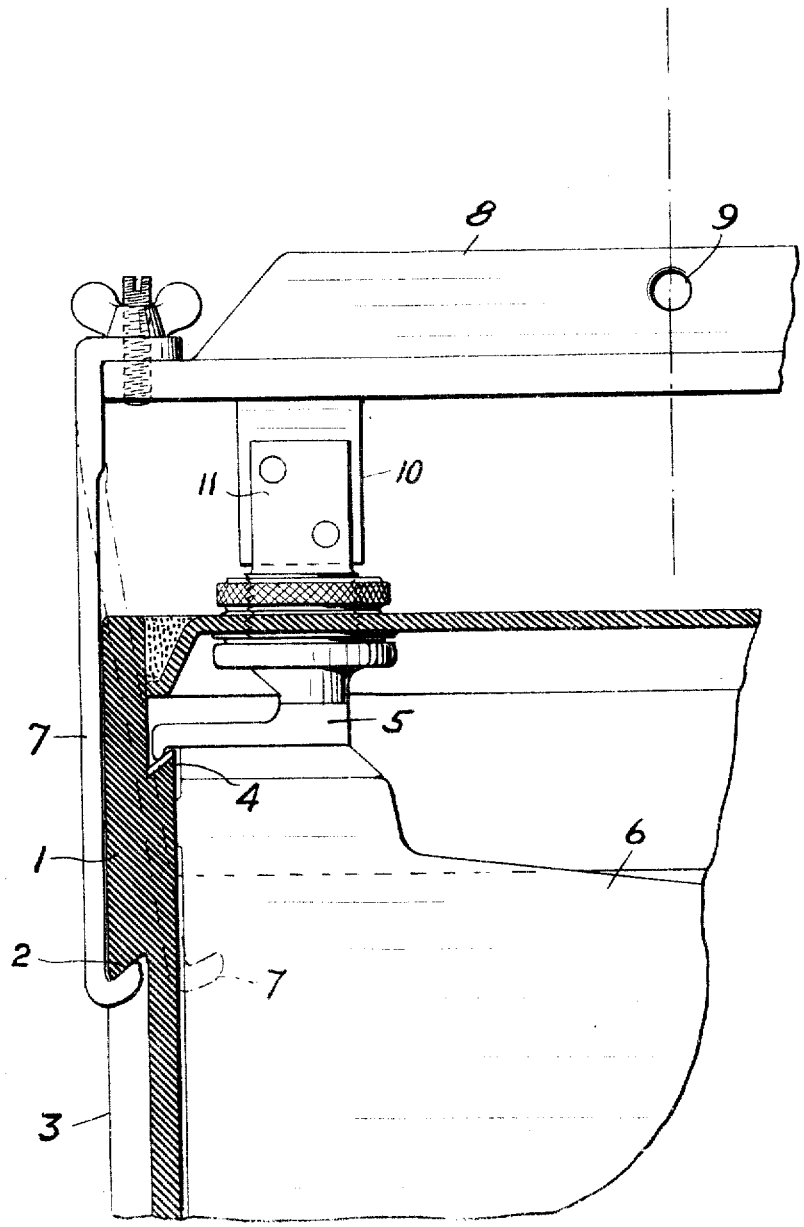

BRUCE FORD, OF PHILADELPHIA, PENNSYLVANIA.

ELECTRIC STORAGE BATTERY.

1,271,692.

Specification of Letters Patent.

Patented July 9, 1918.

Application filed March 29, 1918. Serial No. 225,456.

*To all whom it may concern:*

Be it known that I, BRUCE FORD, a citizen of the United States, residing at Philadelphia, in the county of Philadelphia and State of Pennsylvania, have invented certain new and useful Improvements in Electric Storage Batteries, of which the following is a specification.

The principal object of the present invention is to provide for safely hoisting complete or assembled cells which in the case of submarine and like batteries are very heavy and are contained in jars of insulating material possessed of little tensile strength.

Other objects of the invention will appear from the following description and the invention will be claimed at the end hereof but an embodiment of the invention will first be described in connection with the accompanying drawing forming part hereof and which is a view principally in section.

In the drawing, 1, is a reinforcement having at its lower edge a seat 2, which may be undercut. The reinforcement 1, is arranged at the top of the opposed walls, usually the end walls, of the jar and extends well below the ledge 4, upon which is seated the bus-bar 5, from which the plates 6, depend. The reinforcement 1, and the jar wall 3, are of molded insulating material which is known to be of little tensile strength. Hard rubber and equivalent substances are examples of such material. 7, is a hook which engages the seat 2, and the lifting stress of the hook is resisted by the compression or shearing strength of the considerable mass of material provided vertically between the ridge 4 and the seat 2, by the reinforcement 1. The hook 7, depends from one end of a yoke 8, centrally provided with an opening 9, which is a means by which the yoke can be connected with hoisting tackle. It will be understood that in the drawings and description reference is made to only one-half the arrangement, but from this the other and duplicate half will be readily understood. The hook 7, normally has an inward set, as shown in dotted lines so that it tends to remain in engagement with the seat 2. Moreover the hook 7, is shown as detachably connected with the yoke 8, which is a matter of convenience in packing and storing. In any event the weight of the jar and electrolyte contained in it is carried by the reinforcement and to this load there is frequently added the weight of the plates. 10, are bars depending from the yoke and they can be bolted to the terminals 11, not necessarily to carry any part of the weight of the plates, but to provide stability to the structure 7—8, principally in regard to lateral motion relative to the jar, and also to prevent the plate structure from falling in case of accidental failure of the hooks 7, so that in that case only the jar and electrolyte would fall.

What I claim is:

1. A storage battery jar provided internally with a plate-supporting ledge, and provided at its top with a reinforcement having an undercut seat arranged on the outside of the jar and below the ledge, substantially as described.

2. The combination of a storage battery jar provided internally with a plate-supporting ledge and provided at its top with a reinforcement having an undercut seat arranged on the outside of the jar and below the ledge, and a yoke having hooks for detachably engaging said seat.

3. The combination of a storage battery jar provided internally with a plate-supporting ledge and provided at its top with a reinforcement having a seat arranged on the outside of the jar and below the ledge, and a yoke having hooks for detachably engaging said seat.

4. The combination of a storage battery jar provided internally with a plate-supporting ledge and provided at its top with a reinforcement having a seat arranged on the outside of the jar and below the ledge, and hooks for detachably engaging said seat.

BRUCE FORD.